United States Patent Office 2,854,757
Patented Oct. 7, 1958

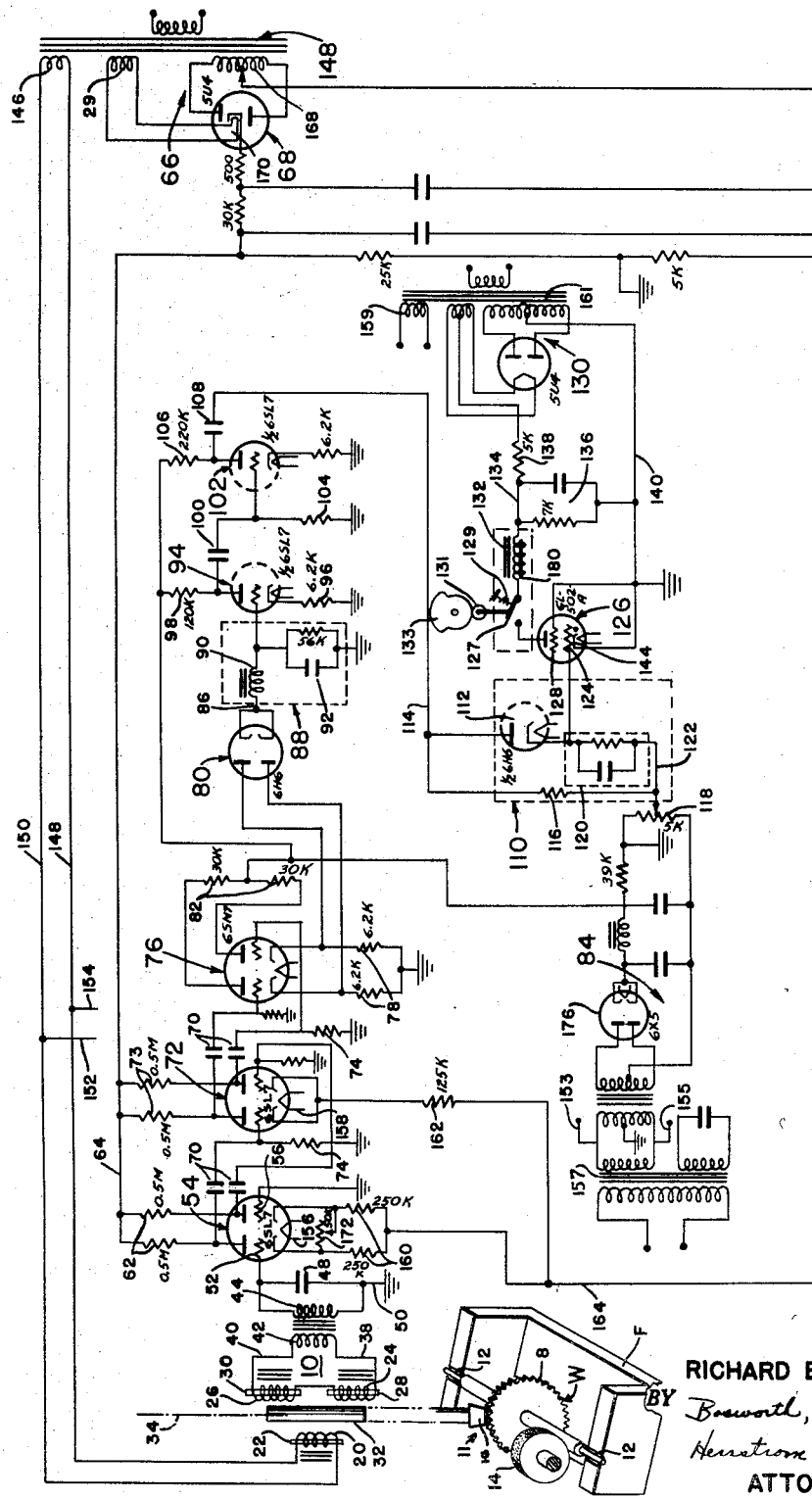

2,854,757

RUN-OUT DISCRIMINATOR GAGE

Richard E. Roeger, Maple Heights, Ohio, assignor to Cleveland Instrument Company, Cleveland, Ohio, a corporation of Ohio Application September 17, 1954, Serial No. 456,671

3 Claims. (Cl. 33—174)

This invention relates to gages and gaging devices and, more particularly to gages for detecting runout, eccentricity, out-of-roundness, wobble and the like (all or any of which conditions are hereinafter referred to as "runout") in articles of manufacture and for rejecting those articles in which the runout exceeds predetermined tolerances.

A specific example of an application of the invention is found in the gaging of articles of manufacture to determine eccentricity or out-of-roundness irrespective of the dimensional tolerances of the articles being gaged. In the precision gaging art, it is often necessary to know, in addition to whether workpieces fall within specified dimensional tolerances, whether, for example, the outer surfaces of the workpieces are concentric with inner parts or surfaces within established tolerances. Eccentricity may occur not only in individual parts, but in assemblies of two or more parts, each of which may comply with prescribed tolerances as to roundness, concentricity, and the like, but which, when assembled, may compound the deviation from standard beyond the tolerance established for the assembly.

The measure of runout is difficult because parts whose lineal dimensions may be within established tolerances may be defective with respect to runout. For example, it is conceivable that a cylindrical part may pass a go, no-go type of inspection and yet be so far out of round as to be unacceptable notwithstanding the results of the first inspection. Also, the linear dimensional difference between an acceptable undersize assembly and an acceptable oversize assembly may exceed a linear runout dimensional limit even though the assembly is sufficiently free from eccentricity to meet the runout specifications. It is necessary, therefore, to be able to differentiate or discriminate by a gaging process between difference in sizes of parts which merely represent variations in lineal dimensions, such as diameters, and amount of runout which, if excessive, will render the part unacceptable regardless of conformity to other dimensional requirements.

To meet the problems encountered in gaging eccentricity, out-of-roundness, wobble, and the like (i. e., runout) in articles of manufacture, it is a general object of this invention to provide gaging means for detecting these conditions and discriminating between these conditions and ordinary variations in lineal dimensions and means actuated by the gaging means to separate or otherwise classify defective parts from acceptable parts.

Other objects of the invention include the provision of an improved electronic system in combination with gaging means for detecting runout in workpieces; the provision of an electronic system which is responsive to input signals of a given frequency and unresponsive to spurious signals and other electrical interference; the provision of gaging means in combination with an electronic system which will consistently repeat, is fast acting, stable, and highly precise; and the provision of gaging means including a low frequency pickup or transducer and means for filtering and amplifying the signal output of the transducer to energize a thyratron circuit under certain critical conditions for the purpose of rejecting articles in which runout exceeds a predetermined value.

To the accomplishment of the foregoing and related ends, the invention, then, consists of the means hereinafter fully described and particularly pointed out in the claims; the annexed drawings and the following description setting forth in detail certain structure embodying the invention, such disclosed means constituting, however, but one of various forms in which the principle of the invention may be used.

In the drawings Figure 1 is a schematic diagram of a preferred embodiment of the invention, and Figure 2 is a perspective illustrating an example of a workpiece which the apparatus of Figure 1 is adapted to gage.

As shown in Figure 2, the workpiece W consists of a small gear 5 mounted on a shaft 6 having end spindles or bearing portions 7. Gears of this type are used in the watch and instrument industry and frequently are made by pressing the gear 5 upon the shaft 6. In gears manufactured in this fashion, the gears are sometimes eccentric with respect to the shaft. This can occur even though the gears and the shafts are both round within establishing tolerances and both meet established tolerances as to diameter. Another condition that can occur is for the gear to be mounted on the shaft at an angle other than right angles thereto so as to cause the gear to wobble. Thus, for the gears to be acceptable, the peripheral portion 8 of the gears must be concentric with the spindle or bearing portions 7 within predetermined limits, and the gears must be mounted upon the shafts 6 substantially at right angles thereto so that the peripheral portion 8 will not wobble when the shaft is rotating.

The present apparatus is designed for the detection of these and other similar conditions of runout and is arranged to reject gears in which the runout exceeds a predetermined minimum and to discriminate between runout and ordinary dimensional variations, the gaging mechansim being responsive only to runout and not to variations in lineal dimensions such as variations in the diameters of the gears 5 or the thickness of the gears 5.

Briefly, the preferred form of apparatus shown in Figure 1 embodies a pickup or transducer 10 which is provided with a gaging point 11 adapted to engage the peripheral edge 8 of the workpiece W. The workpiece is supported in accurate bearings 12 engaging the spindles 7 and is rotated at a predetermined speed, for example, 360 R. P. M., by any convenient means such as the pinion 4 which engages shaft 6, with the gage point in engagement with the peripheral edge of the workpiece. With this arrangement any eccentricity or runout between the spindle 7 and the peripheral edge 8 results in reciprocation of the gaging point and hence, actuation of the pickup or transducer. The signal or output of the transducer resulting from the motion of the gaging point because of the eccentricity of the gear is amplified and utilized to control an apparatus for rejecting workpieces in which the runout exceeds a predetermined amount, while the output of the transducer resulting from the average position of the gage point without regard to its motion, i. e., resulting from the diameter of the workpiece, is eliminated by the electrical circuit and is without effect on the rejecting mechanism.

Referring now in greater detail to Figure 1, the transducer 10, which is preferably constructed in accordance with the teachings of Patent No. 2,626,119, issued to Erwin W. Graham, comprises an exciter coil 20 wound on a transformer iron core 22, pickup coils 24 and 26 wound on suitable iron cores 28 and 30, respectively, and a ferro-magnetic armature 32. The exciter coil 20 is energized by 60 cycle alternating current of the same or opposite phase as is supplied to a secondary 146 of the power transformer of the power supply unit 66. Thus, the alternating current supplied to the tubes and the alternating current supplied to the pickup unit bear the same or opposite phase relationship to each other. The pickup coils 24 and 26 are connected in series and wound so that the voltage induced in one is 180° out of phase with the voltage induced in the other. So long as the armature 32 is centered so that the flux paths between the exciter coil 20 and the pickup coils 24 and 26 are identical, these two voltages are of substantially the same value and cancel each other so that the output of the pickup is substantially zero; but one voltage increases and the other decreases if the movable armature 32 is moved along its axis 34 by gage tip 11, which contacts the periphery 8 of workpiece W. Movement of the armature 32 upwardly improves the flux path between the coil 20 and coil 26 at the expense of the flux path between the coil 20 and coil 24. For downward movement of the armature 32, the reverse flux variation obtains.

With this arrangement the phase of the resultant output of the two coils depends upon the direction of displacement of the armature from the neutral position, while the amplitude of the output depends upon the amount of displacement. In the present apparatus, the pickup is adjusted so that the armature is always on the same side of the neutral position so that there is no reversal of phase in the output. Thus, when a workpiece to be tested is rotated in contact with the gaging point 11, any eccentricity in the workpiece will cause the gaging point 11 and the armature 32 to reciprocate. The output of the pickup varies correspondingly, with one cycle of variation being completed for each revolution of the workpiece. In the example given, with the workpiece rotating at 360 R. P. M., the output of the pickup may be considered as containing a 6 cycle per second alternating current component resulting from the eccentricity of the workpiece; this component, or perhaps more accurately, the peak voltage of this component, is used to control the mechanism for rejecting defective workpieces through the circuit described below. In the preferred form of the invention, the initial stages of the circuit are constructed in accordance with the teachings of Patent No. 2,508,370, issued May 23, 1950, to M. Bozoian.

The outside leads 38 and 40 from the pickup coils 24 and 26 respectively, which are connected in series, are brought to a primary 42 of an iron core transformer, the secondary of which is indicated at 44. A tank circuit is formed by the inclusion across the secondary 44 of a condenser 48 and one side of this circuit 50 is connected to ground and the other to the grid 52 of a double triode tube 54, the other grid 56 of the tube being connected to ground.

Tube 54 forms the first of two stages of a resistance-capacitance coupled amplifier. The anodes of the tube 54 are connected through resistances 62 to the lead 64 from the rectified D. C. plate supply of the power supply unit 66, which, as indicated, includes a single-phase full-wave rectifier tube 68. The anodes also are connected through condensers 70 as indicated to the grids of a second double triode tube 72 forming the second stage of the amplifier. The anodes of the tube 72 are connected through resistances 73 to the plate supply lead 64, and the grid leads go through the resistances 74 to ground.

The anodes of tube 72 are also connected through condensers 70 to the grids of a third double triode tube 76 and then through resistance 74 to ground. The cathodes of the double triode tube 76 are connected through suitable resistance 78 to ground and also to the plates of a double diode tube 80. The plates or anodes of the double triode tube 76 are connected through suitable resistances 82 to a rectifier indicated, in general, at 84. A single lead 86 connects the leads from the cathodes of the double diode tube 80 to a filter unit generally indicated by the number 88 and comprising a choke 90 and a resistance-capacitance circuit 92 which is suitably grounded.

The signal prior to entering the filter is comprised of three components, a 6 cycle portion superimposed upon a 120 cycle portion and transmitted together with a D. C. component. The D. C. component will vary with the diameter of the workpiece W being gaged since the initial displacement of the gaging tip will be a function of the diameter of the workpiece. The amplitude of the 6 cycle component is a function of the degree of runout of the workpiece, and the 120 cycle component comprises a rectification by the double diode tube 80 of the 60 cycle voltage received and transmitted by the exciter coil 20 of the gage head 10. The filter 88 eliminates the 120 cycle component of the signal although a certain amount of the D. C. signal may still remain.

The signal at this point in the circuit is, at a peak value, approximately .05 of a volt, and comprises a 6 cycle A. C. signal and possibly a small component of a D. C. signal. The signal is received by a single triode tube 94, the cathode of which is suitably grounded through a resistance 96 and the anode or plate lead is connected through a resistance 98 to the rectifier unit 84. The plate lead is also connected to a condenser 100 which, with the single triode tube 94, eliminates the D. C. component of the signal. The single triode 94 boosts or amplifies the signal to approximately 1½ volts at its peak and it is then received by single triode tube 102 for further amplification. The lead from the right side of the condenser 100 is connected through a resistance 104 to ground and also directly to the grid of the single triode tube 102. The cathode of the single triode tube 102 is connected through a resistance to ground, and the lead from the plate is connected through a resistance 106 to the rectifier 84.

The lead from the plate is also connected to a condenser 108 and from the condenser to a peak reading volt meter circuit, generally designated at 110. At this point in the circuit, the signal has now been boosted or amplified to a peak of approximately 30 volts. The peak reading volt meter circuit 110 comprises a single diode tube 112, the plate lead being connected to line 114 coming from condenser 108. The line 114 coming from condenser 108 is also connected to a resistance 116 which is connected to lead 122 of a potentiometer or runout sensitivity control 118. The lead from the cathode of the single diode tube 112 is connected to a capacitance-resistance circuit 120 which is also connected to the lead 122 of the runout sensitivity control 118. The cathode lead of tube 112 is further connected to a bi-stable electronic valve, an example of which is a thyratron type gas filled discharge tube. In the preferred illustration in Figure 1, the cathode lead of tube 112 is connected to one grid 124 of the thyratron tube 126. The other or second grid 128 of the thyratron tube 126 is connected to ground and also to the thyratron D. C. rectifier 130. The lead from the cathode of the thyratron is also connected to ground and to the thyratron D. C. rectifier 130.

The lead from the plate or anode of the thyratron tube 126 is connected to one side of a normally open switch 127, and the other side of the switch is connected to a solenoid 132 which is energized by the thyratron when a sufficient voltage signal is received from the peak reading volt meter circuit 110.

The contacts of the switch 127 are maintained normally open by a spring 129 or by any other known expedient. The spring 129 maintains one of the switch contacts in bearing relationship with a cam follower 131 which is actuated by a cam 133. The cam 133 is timed, in this particular embodiment, by means not shown, to make one revolution for every six revolutions of the workpiece W. The first third of a revolution of the cam corresponding to the first two revolutions of the workpiece allows the contacts of the switch 127 to remain open. This is done to prevent the thyratron tube 126 from firing while the system is becoming stabilized. Thereafter, the contacts of the switch 127 are closed by a raised portion of the cam face during the next two revolutions of the workpiece and the middle third of a revolution of the cam to enable the thyratron tube 126 to fire responsive to a signal indicating excessive runout on the workpiece. The last third of the cam face permits the contacts of the switch 127 to reopen and prevent further firing of the thyratron tube.

The solenoid 132 is connected by a lead 134 through a resistance 138 to the thyratron D. C. rectifier 130. A capacitance resistance unit 136 is connected from the line 134, to the right of the solenoid 132, to the line 140 which connects the cathode 144 and grid lead 128 of the thyratron to the D. C. rectifier 130.

The tubes in this system are of the indirectly heated type. The cathodes of tubes 54, 72 and 76 are connected for heating to secondary 146 of transformer 148 through leads 152 and 154 which tap onto leads 148 and 150. The cathodes of tubes 94, 102, 112 and 176 are connected for heating to leads 153 and 155 of the transformer 157. The cathode of tube 68 is heated by secondary 29 of transformer 148, and the cathode of thyratron 126 is heated by secondary 159 of transformer 161. The cathode elements of tubes 54 and 72 are connected through resistances 160 and 162 and a lead 164 to the center tap 166 of the secondary 168 of the transformer 148. It will thus be seen that the lead 164 forms one side of a filter circuit, the other lead of which is indicated at 64 and connects with leads passing to the anodes of tubes 54 and 72. Rectification of current passing to the filter is obtained by conventional rectifier tube 68 with a heater 170 connected to a secondary 29 of the transformer 148 in the usual manner.

A variable resistance 172 is provided in the cathode circuit of the tube 54 to limit the amplifier gain. The capacitances and the resistance values of the various components of the circuit are shown in Figure 1. All values assigned to the condensers are expressed in microfarads. Most of the numerical values of the resistances are followed either by K or M, the former meaning 1,000 ohms and the latter meaning 1,000,000 ohms; those values without any letters are expressed in ohms. While the values given are those preferably employed, it will be understood that changes may be made in their values without departing from the scope of the invention. The tubes 54 and 72 are of the type designated as 6SL7 while the tube 76 is designated as 6SN7; tube 176 is designated as 6X5; tubes 94 and 102 are designated as ½ 6SL7. The thyratron tube is designated as GL–502–A.

In operation, the runout sensitivity control 118 is set to predetermine the peak voltage which will fire the thyratron tube 126. Sensitivity control 118 is normally set just below the firing peak voltage so that the thyratron tube 126 does not fire. The signal voltage supplies the additional voltage required to fire the thyratron, and since this signal voltage is proportional to the amount of runout, the setting of control 118 determines the sensitivity at which thyratron 126 fires. The tip 11 of the transducer armature 32 is placed in contact with a rotating workpiece W in any suitable manner so that as the piece rotates, if there is runout, the amount of runout will cause the tip to move along axis 34 with respect to the coils 24 and 26, thereby developing a signal in the system. If peripheral runout is being gaged, the tip 11 will contact the periphery 8 of the workpiece W. An adapter 16 is fitted to the tip 11 to ride smoothly on the periphery formed by the tips of the gear teeth. To detect wobble of the gear 5 with respect to the shaft 6 (Figure 2) the fixture F will be adjusted so as to bring the gaging tips 11 in contact with the face 15 of the gear 5 and normal thereto. The gear is then rotated, and if any runout or wobble exists, the measuring tip will be oscillated, causing the measuring head to generate a very low frequency wave corresponding to the revolutions per second at which the gear is rotated.

It has been found that for best gaging results, the gear may be rotated between five to eight revolutions per second, wherein an accurate determination can be made after three or more cycles of the revolving gear. The apparatus tends to lose sensitivity below five revolutions per second and over eight revolutions per second.

The signal, which is very weak at first and also contains components which are undesired such as the D. C. component and the 120 cycle component, is filtered through the system as set forth hereinabove and amplified through various stages of the amplifier tubes until a voltage peak is obtainable sufficient to fire the said thyratron tube 126. If in fact there is undesirable runout on the workpiece, the voltage will be of sufficient magnitude to fire the thyratron tube thereby actuating the solenoid 132.

After the thyratron tube is actuated or fired responsive to a runout, or wobble condition exceeding a predetermined tolerance, the solenoid is adapted to make contact, by means of its iron core plunger 180, with a suitable relay limit switch, or the like, which operates a by-pass chute, trap door, baffle, or other suitable means to remove a rejected gear from the subsequent sequence of operations. If the gears are set up on a turntable type conveyor which carries the gears sequentially from work station to work station, the tripping of a relay by the solenoid plunger may drop the gear from the turntable before the gear is indexed to the next work station. In this way, only acceptable gears will be completely processed and rejects will be detected before unnecessary time and labor is expended on a defective part or assembly. Under certain conditions, a collet or chuck may be more suitable than the fixture F to hold and rotate the workpiece W. The best type of workholding fixture will be dependent on the type, size, weight and shape of the workpiece and may be modified to give best results in any given gaging operation.

While only one embodiment of the invention is shown herein, it is contemplated that other arrangements and modifications will occur to those skilled in the art and may be resorted to without departing from the scope of the invention.

I claim:

1. A run-out discriminator gage comprising a measuring head having an exciter coil, a pair of pick-up coils connected in series and opposite in phase, with their end leads connected to the primary of a transformer, and an iron core armature between said exciter coil and said pair of pick-up coils, the end pole faces of said coils being parallel to the longitudinal axis of said iron core armature; a gaging tip secured to one end of said armature and adapted to make sliding engagement with a workpiece rotated at a predetermined steady rate, movement of said gaging tip caused by contact with an eccentric portion on said rotating workpiece generating a voltage signal in said measuring head; an indicator stage including a double triode tube, circuits connecting the grids thereof with the secondary of said transformer whereby the grids are 180° apart in phase; a source of low frequency alternating current; means to supply said current to said exciter coil; a double diode tube, means connecting said double diode to said double triode tube; filter means connected to the said double diode tube and adapted to filter all but the lowest frequency signal received therein; and amplifier stage including a triode tube, the grid thereof being connected to said filter means; condenser means connected to the plate of said triode tube, said triode tube and said condenser being adapted to filter any direct current component from a signal received therein; bistable electronic valve means connected in series with said condenser and adapted to fire at a low frequency voltage of predetermined amplitude; and relay means connected in series with said bi-stable electronic valve means to be operated thereby.

2. A discriminator gage to detect run-out, and the like in circular articles of manufacture comprising a gaging head, having a low frequency voltage exciter coil, a pair of pick-up coils, and an iron core armature adapted to vary the flux density between the exciter coil and the pick-up coils when oscillated along its longitudinal axis, said oscillation generating an ultra-low frequency voltage signal; a source of low frequency alternating current to energize said exciter coil; a gaging tip secured to one end of said armature; means for mounting said gaging head so as to bring said gaging tip into contact with a rotatable circular surface of a workpeice; means to rotate said workpiece at an angular velocity sufficient to oscillate said gaging tip and said armature, if eccentricity is inherent in said workpiece, to generate said ultra-low voltage signal; a transformer having primary and secondary windings, said pick-up coils being connected in series and opposite in phase with their lead ends connected to the primary of said transformer; signal detector means including a double triode tube with the grids thereof connected to the secondary of said transformer; and a double diode rectifier tube with the plates thereof connected to the cathodes of said double triode tube; means to filter low frequency voltage signals from the ultra-low frequency voltage signal connected to the cathodes of said double diode tubes; signal amplification means including a single triode tube with the grid thereof connected to the said filter means; condenser means connected to the plate of said single triode tube; said single triode tube and said condenser being adapted to filter D. C. voltage signals from the ultra-low frequency voltage signal; a peak reading volt meter circuit including a run-out sensitivity control potentiometer, connected to said condenser means, said peak reading volt meter circuit having a single diode tube, with the plate thereof being directly connected to said condenser means, a resistance also connected to said plate, a parallel condenser-resistor circuit connected to the cathode of said single diode tube, said plate resistance and said parallel condenser-resistor circuit being connected to a tap from said run-out sensitivity control potentiometer; a thyratron tube with a grid thereof connected to the cathode of said single diode tube, and the plate thereof connected to a solenoid.

3. A run-out discriminator gage comprising: a transducer having primary and secondary coils; a source of low frequency alternating current to energize said primary and secondary coils; a transducer gaging tip adapted to engage a surface of a workpiece; means to rotate said workpiece at a predetermined steady rate to oscillate said gage tip, whereby an ultra-low frequency voltage signal is generated by said transducer when said workpiece surface has run-out; signal detector means connected to said transducer; means connected to said signal detector means to filter from said ultra-low frequency voltage signal said low frequency voltage signals developed by said low frequency alternating current; ultra-low frequency signal amplification means connected to said low frequency voltage filter means; means to filter direct current signal components from said ultra-low frequency signal; peak reading voltage signal means connected to said signal amplifying means; bi-stable electronic valve means connected to said peak reading voltage signal means adapted to be opened by a predetermined peak voltage signal; means adapted to be actuated by the opening of said bi-stable electronic valve means; switch means connecting said bi-stable electronic valve means to said means adapted to be actuated by said bi-stable electronic valve means; means synchronized with the rotation of said workpiece to sequentially open said switch means during a predetermined number of revolutions of said workpiece, and thereafter to close said switch means for a subsequent predetermined number of said revolutions of said workpiece.

References Cited in the file of this patent

UNITED STATES PATENTS

| 2,240,278 | Abbott | Apr. 29, 1941 |
| 2,481,863 | Owens | Sept. 13, 1949 |
| 2,503,851 | Snow | Apr. 11, 1950 |
| 2,508,370 | Bozoian | May 23, 1950 |
| 2,545,881 | Graham | Mar. 20, 1951 |
| 2,584,714 | Kirkpatrick | Feb. 5, 1952 |

FOREIGN PATENTS

| 666,898 | Great Britain | Feb. 20, 1952 |